H. P. DECHERT.
Galvanic Battery.
No. 164,270.　　　　　　　　　　　Patented June 8, 1875.
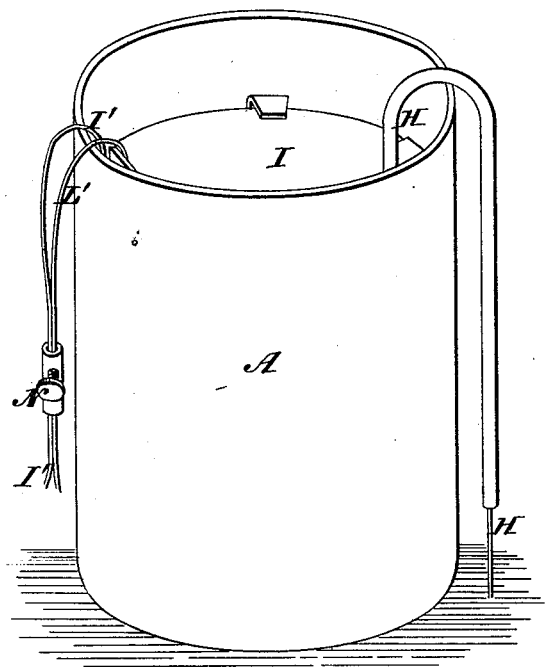
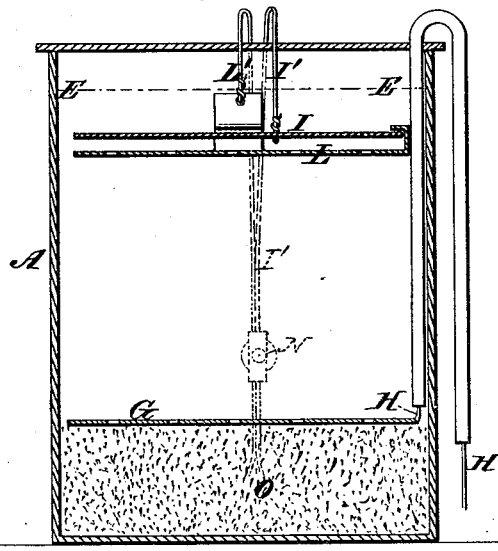
Witnesses:
Jas. Martin Jr.
J. N. Campbell
Inventor:
Howard P. Dechert
by
Mason Fenwick & Lawrence
Atty.

UNITED STATES PATENT OFFICE.

HOWARD P. DECHERT, OF NEW YORK, N. Y.

IMPROVEMENT IN GALVANIC BATTERIES.

Specification forming part of Letters Patent No. 164,270, dated June 8, 1875; application filed November 12, 1874.

*To all whom it may concern:*

Be it known that I, HOWARD P. DECHERT, of the city, county, and State of New York, have invented a new and useful Improvement in Poles for Galvanic Batteries; and I do hereby declare that the following is a full, clear, and exact description thereof, reference being had to the accompanying drawings, making a part of this specification, in which—

Figure 1 is a perspective view, and Fig. 2 a vertical central section of my improved galvanic-battery pole.

The nature of my invention consists in placing a secondary or local-action copper pole, separate from and out of the circuit of the primary or line circuit-pole, in all batteries in which a soluble metallic salt is decomposed by the action of one of the poles, such as the sulphate-of-copper battery.

It is a well-known difficulty in the employment of such batteries that by means of the solution working upon the zinc too freely the zinc becomes coated with a deposit of precipitated metal, a dropping of the power of the battery and uncertainty attending its use being the result.

The object of my invention is to remove the difficulty by the use of a galvanic-battery pole constructed as follows:

A, the containing-vessel; G, primary pole; I, zinc pole; L, secondary pole; L', connection of secondary pole; H, connection of primary pole; I', connecting-wire of zinc pole to primary pole of next cell or vessel; N, binding-screw; E, line of liquid; O, crystals of blue vitriol.

In order to prevent the deposit referred to, and to keep the battery in working order without regard to the action of the main or primary-pole circuit, I insert adjacent to the zinc plate I, (near it,) and between it and the primary copper pole G, a secondary copper pole, L, of perforated sheet-copper, wire coil, or net-work. Said secondary pole I connect securely by the wire I', or otherwise, with the zinc plate, and thereby form a local circuit, which acts as long as the metallic-salt solution touches the said secondary pole, and no longer; or I connect the said secondary pole of the one cell with the zinc of another, and so on throughout the whole battery to the first cell, thus forming a full local circuit without any resistance, and without utilizing the current so far as to retard its course to any considerable extent. By this means the copper or other metal will not deposit to any considerable extent upon the zinc, and the battery will be kept in working order so long as there remains the copper-salt solution in the cell, and zinc sufficient to perform the action.

What I claim as my invention is—

A secondary or local circuit-pole, separate and distinct from the primary pole, applied in connection with a primary pole, substantially as and for the purpose set forth.

HOWARD P. DECHERT.

Witnesses:
J. N. CAMPBELL,
J. W. HAMILTON JOHNSON.